United States Patent [19]

Andvig

[11] 4,026,239
[45] May 31, 1977

[54] GREASE LEVEL INDICATOR

[75] Inventor: Tore A. Andvig, Kongsberg, Norway

[73] Assignee: A/S Kongsberg Vapenfabrik, Kirkegardsveien, Norway

[22] Filed: Dec. 3, 1975

[21] Appl. No.: 637,195

[30] Foreign Application Priority Data

Dec. 3, 1974 Norway ............... 744349

[52] U.S. Cl. .................. 116/118 R; 116/114 R
[51] Int. Cl.² ............................... G01F 23/00
[58] Field of Search .......... 116/118 R, 114 R, 109; 33/126.7 R, 126.7 A; 277/2; 64/9 R; 73/290 B, 323, 290 R; 184/1 C

[56] References Cited

UNITED STATES PATENTS

| 2,121,507 | 6/1938 | Morgan | 64/9 R |
| 2,297,850 | 10/1942 | Woolery | 33/126.7 R |
| 2,751,877 | 6/1956 | Boone | 116/109 |
| 2,871,681 | 2/1959 | Beecher | 64/9 R |
| 2,910,956 | 11/1959 | Scully | 116/109 |
| 3,174,302 | 3/1965 | Pomper | 64/9 R |
| 3,375,901 | 4/1968 | Farrell | 64/9 R |
| 3,638,453 | 2/1972 | Ehret | 64/9 R |

Primary Examiner—S. Clement Swisher
Assistant Examiner—Denis E. Corr

[57] ABSTRACT

A threaded plug in a grease filling opening on the periphery of a rotating sleeve is formed with a tube-shaped extension having lateral openings near its base, whereby the plug may be used as a grease level indicator.

1 Claim, 2 Drawing Figures

GREASE LEVEL INDICATOR

BACKGROUND OF THE INVENTION

The present invention relates to an indicator for the grease level in rotating sleeves, especially tooth couplings, having a peripheral opening closed by a plug.

Tooth couplings filled with grease is used in great quantities in the mechanical industry. By rotation of the coupling the grease will form an annular layer on the inner side of the sleeve portion of the coupling due to centrifugal force. Because of the degree of consistency of the grease the annular layer will not substantially change its form after the machine has been stopped. For proper operation it is important that the couplings are filled with a proper amount of grease. A variation in the amount of grease is reflected in a varying thickness of the grease layer on the inner side of the sleeve-shaped portion of the coupling. On one hand, the amount of grease should not be too great. However, if the thickness of the grease layer on the other hand goes below a certain value, damages of the coupling may occur.

Since small leakages of grease from the coupling may occur under operation it is important regularly to inspect the grease level. However, experience has shown that a simple and cheap accomplishment of this inspection has been difficult. Accordingly, it is an object of the present invention to provide a simple and practical indicator for the grease level in rotating sleeves in general and especially in tooth couplings.

SUMMARY OF THE INVENTION

According to the invention the plug closing the filling opening at the periphery of the sleeve is provided with a tube-shaped extension of a length sufficient to extend through the grease layer on the inner wall of the sleeve, said extension adjacent said inner wall having lateral openings through which the interior of the tube-shaped extension communicates with the outer side thereof.

Because of the lateral openings in the extension the grease will adjust itself to the same level in the interior of the tube-shaped extension as on the inner wall of the sleeve on the outer side of the extension. After the sleeve has been stopped the plug may be unscrewed, the grease in the interior of the tube-shaped extension following the plug without any change of the grease level. Thereupon the grease level may easily be determined, for instance by a direct reading on a scale in the plug. Alternatively, the plug may only carry marks indicating a maximum and a minimum grease level in the same manner as ordinary dipsticks. However, scales or reading marks on the plug are not absolutely necessary, since the grease level may be determined in the plug in any suitable manner.

Further features and advantages of the indicator according to the invention will appear from the following description, reference being had to the drawing.

DETAILED DESCRIPTION OF THE PREFERRED EMBODIMENT

Figure 1:
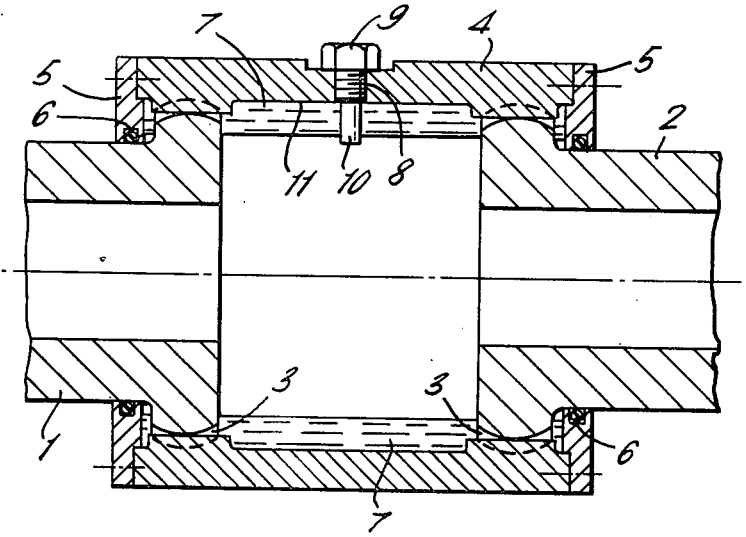
FIG. 1 diagrammatically illustrates an axial sectional view through a tooth coupling connecting two rotating shafts.

As shown in the drawing, the ends of two shafts 1 and 2 are provided with teeth 3 on the periphery. These teeth 3 engage corresponding interior teeth in a sleeve 4 which, consequently, couples the shafts 1 and 2. At the ends the sleeve 4 is closed by annular covers 5 having a gasket 6 for sealing against the shafts 1, 2.

Figure 2:
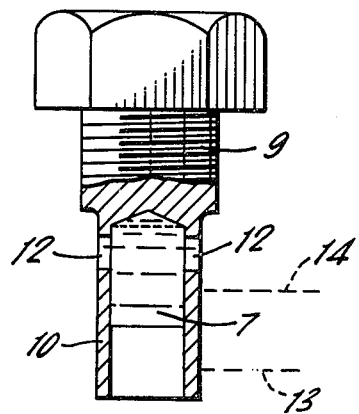
FIG. 2 shows on a larger scale and partly in section a suitable embodiment of a plug designed to serve as a grease indicator according to the invention.

For lubrication of the tooth flanks the sleeve 4 contains an appropriate amount of grease which upon rotation of the coupling forms an annular layer 7 on the inner wall surface of the sleeve 4. For filling and replenishing the coupling with grease a filling opening 8 closed by a threaded plug 9 is formed in the periphery of the sleeve 4. As illustrated in FIG. 2, this plug 9 has a tube-shaped extension 10. At its base, which will be adjacent the inner wall 11 of the sleeve 4, the extension has lateral openings 12 which provide a communication between the interior of the extension 10 and the outer side thereof.

As illustrated in FIG. 2, the extension 10 is of such a length that it will extend through the grease layer 7 on the inner wall 11 of the sleeve. In FIG. 2 the maximum permitted grease level is indicated by 13 and the minimum grease level is indicated by 14. Thus, the extension 10 will extend beyond the grease level 13, whereas the openings 12 will be closer to the sleeve 4 than the lower grease level 14. Thus, the openings 12 always lie within the grease layer, and, therefore, permit an equalizing of the grease levels within and outside, respectively, the tube-shaped extension 10. When the coupling rotates the grease level within the tube-shaped extension 10 will, therefore, rapidly become the same as outside the indicator plug, grease being forced into or out of the openings 12 during operation. After the coupling has been stopped, the plug 9 in the filling opening 8 may be unscrewed and the grease level inside the extension 10 may readily be determined. Since the grease level in the extension 10 will not change noticeably when the plug is unscrewed from the coupling it will provide a measure for the grease level inside the coupling.

The indicator according to the invention has been tested in a coupling, the results being very satisfactory. In the embodiment tested the tube-shaped extension 10 had an inner diameter of about 13 mm and two connecting openings 12 having a diameter of about 6 mm. It will readily be understood that these dimensions are not critical and that other dimensions and dimensional ratios are, of course, possible.

What I claim is:

1. In a rotating body which includes a quantity of grease therein forming a body/grease junction, said grease forming an annular ring therein, an indicator for indicating the thickness of said annular ring, said indicator comprising:

means defining a radial opening through said rotating body;

plug means for removably sealing said means defining a radial opening;

tubular extension means, included on said plug means, for extending through said annular grease ring, said tubular extension means including inner and outer walls; and means defining an aperture in said tubular extension means for placing said inner and outer walls in communication at said body/grease junction.

* * * * *